(12) United States Patent
Olivé

(10) Patent No.: US 12,229,611 B2
(45) Date of Patent: Feb. 18, 2025

(54) ALARM SYSTEM COMPONENT WITH UNPOWERED EVENT DETECTION

(71) Applicant: Carrier Corporation, Palm Beach Gardens, FL (US)

(72) Inventor: Pere Moix Olivé, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 18/446,836

(22) Filed: Aug. 9, 2023

(65) Prior Publication Data

US 2023/0385588 A1    Nov. 30, 2023

Related U.S. Application Data

(63) Continuation of application No. 17/116,500, filed on Dec. 9, 2020, now abandoned.

(30) Foreign Application Priority Data

May 8, 2020    (EP) .................................... 20382382

(51) Int. Cl.
G06K 19/07    (2006.01)
G06K 7/00    (2006.01)
G06K 17/00    (2006.01)

(52) U.S. Cl.
CPC ....... G06K 19/0723 (2013.01); G06K 7/0008 (2013.01); G06K 17/0022 (2013.01)

(58) Field of Classification Search
CPC ............ G06K 19/0723; G06K 7/0008; G06K 17/0022; G01K 3/005; G08B 29/14
See application file for complete search history.

(56) References Cited

U.S. PATENT DOCUMENTS

| 5,339,072 A | 8/1994 | Agata |
| 5,473,322 A | 12/1995 | Carney |
| 6,232,886 B1 | 5/2001 | Morand |
| 6,816,072 B2 | 11/2004 | Zoratti |
| 6,844,825 B2 | 1/2005 | Shincovich |
| 6,940,410 B2 | 9/2005 | Deacy |
| 6,943,691 B2 | 9/2005 | Chambers |
| 7,004,784 B2 | 2/2006 | Castle |
| 7,274,289 B2 | 9/2007 | Kerr et al. |
| 7,348,875 B2 | 3/2008 | Hughes et al. |
| 7,847,690 B2 | 12/2010 | Murphy |

(Continued)

FOREIGN PATENT DOCUMENTS

CN    204389068 U    6/2015

OTHER PUBLICATIONS

European Search Report for European Application No. 20382382.8; Issued Nov. 10, 2020; 9 Pages.

*Primary Examiner* — Ryan W Sherwin
(74) *Attorney, Agent, or Firm* — CARRIER CORPORATION

(57) ABSTRACT

A component 1 for use in an alarm system includes a component controller 2 and a monitoring module 4. The component controller 2 is configured to control the component 1 when power is supplied to the component 1. The monitoring module 4 includes a power source 6 and is configured to monitor the component 1 when power is not supplied to the component 1, determine occurrence of a predetermined event 12 and to store an indication of the occurrence of the event.

17 Claims, 1 Drawing Sheet

(56) References Cited

U.S. PATENT DOCUMENTS

| | | | |
|---|---|---|---|
| 8,421,629 B2 | 4/2013 | Carr | |
| 9,082,057 B2 | 7/2015 | Mcgregor | |
| 2004/0041703 A1* | 3/2004 | Bergman | G08B 25/003 340/514 |
| 2004/0129312 A1 | 7/2004 | Cuzzo et al. | |
| 2005/0128093 A1 | 6/2005 | Genova et al. | |
| 2008/0048857 A1 | 2/2008 | Billmaier et al. | |
| 2008/0094204 A1 | 4/2008 | Kogan et al. | |
| 2012/0114010 A1 | 5/2012 | Branch | |
| 2014/0320261 A1 | 10/2014 | Davis et al. | |
| 2018/0108250 A1 | 4/2018 | Meah et al. | |
| 2018/0252597 A1* | 9/2018 | Jokinen | G01K 15/005 |
| 2018/0313525 A1* | 11/2018 | Tsai | G01B 21/24 |
| 2018/0356809 A1 | 12/2018 | Trainor et al. | |
| 2019/0145835 A1* | 5/2019 | Jadhav | G06F 13/4022 710/5 |
| 2020/0394900 A1 | 12/2020 | Lontka et al. | |
| 2021/0350192 A1 | 11/2021 | Moix Olive | |
| 2021/0350195 A1 | 11/2021 | Olive | |

\* cited by examiner

ALARM SYSTEM COMPONENT WITH UNPOWERED EVENT DETECTION

CROSS-REFERENCE TO RELATED APPLICATIONS

This application is a continuation of U.S. application Ser. No. 17/116,500 filed Dec. 9, 2020, which claims priority to European Patent Application No. 20382382.8, filed May 8, 2020, the contents of which are incorporated by reference herein in their entirety.

BACKGROUND

The present disclosure relates to a component for use in an alarm system, and particularly to a technique for detecting events when the component is unpowered.

An alarm system, such as a fire alarm system or an intrusion alarm system, comprises a variety of components working in unison to detect and warn people in the event that a change in an environmental parameter has occurred.

If any one of the components of the alarm system, upon installation in the alarm system, is faulty or has been damaged, this can seriously reduce the sensitivity and effectiveness of the alarm system, and thereby its safety.

Testing each individual component or indeed the entire alarm system each time a new component is installed is very time consuming, and in some instances impractical.

A need therefore exists for an improved alarm system component.

SUMMARY

Viewed from a first aspect, there is provided a component for use in an alarm system comprising: a component controller configured to control the component when power is supplied to the component; and a monitoring module comprising a power source and configured to monitor the component when power is not supplied to the component, wherein the monitoring module is configured to determine occurrence of a predetermined event and to store an indication of the occurrence of the event.

The described component may advantageously determine if there has been an occurrence of a predetermined event and store an indication of the occurrence of the event despite power not being supplied to the component. The power source of the monitoring module provides the monitoring module with sufficient power to monitor the status of the component during this period and identify if the component has been manipulated or damaged. A user may check the status of the component and determine if the component is safe to use in an alarm system.

The predetermined event may comprise exposure of the component to a temperature exceeding a predetermined threshold temperature.

The predetermined event may comprise manipulation of the component in a predetermined manner.

The monitoring module may comprise an RFID tag, which may be an active or semi-passive RFID tag. The power source may be an internal battery of the RFID tag. A semi-passive or active RFID tag may be configured to draw power from the internal battery for operation of sensors and the like. An active RFID may be further configured to draw power from the internal battery for RF communication over increased distances relative to a passive or semi-passive RFID tag.

RFID readers do not require line-of-sight in order to interact with RFID tags which can increase speed and efficiency of an interrogation/request for information. For example, the use of RFID technology may allow for multiple monitoring modules to be interrogated at once.

The monitoring module may comprise a memory, and the indication of the occurrence of the event may be stored in the memory. The monitoring module memory may be electrically erasable, programmable, read-only memory (EEPROM). The monitoring module memory may be read-write or write-once, read-multiple (WORM).

The monitoring module may comprise at least one sensor, wherein the sensor is configured to determine the occurrence of a predetermined event.

The at least one sensor may include at least one of a tamper detection sensor, a heat detection sensor, and a shock sensor.

The tamper detection sensor may be a mechanical switch.

The at least one sensor may be configured to be triggered in response to a predetermined threshold value of an environmental parameter being exceeded.

The monitoring module may be configured to transmit the stored indication of the occurrence of an event in response to a read request.

The component controller may be configured to issue the read request after power has been supplied to the component. The component controller may be configured to begin to initialise upon connection to a power source during installation of the component in an alarm system. Initialisation of the component controller may comprise the subsequent activation and start-up procedure of the component controller.

The monitoring module may be configured to communicate with the component controller via a digital interface.

The component controller may be configured to take an action in response to receiving the stored indication of the occurrence of the predetermined event from the monitoring module. The action may comprise triggering an alert. The action may comprise notifying a user of the occurrence of the event.

The component may be configured to notify the user in response to the component controller receiving the stored indication of the occurrence of the predetermined event from the monitoring module. The component may comprise a notification means for generating the notification. The notification means may comprise an audible or visual alarm, such as a buzzer or an LED.

The monitoring module may be configured to directly receive a read request from a wireless transceiver.

The monitoring module may comprise a plurality of sensors. It is advantageous to have a sensor directed to each predetermined event that may possibly occur to the component while in storage or transit.

The monitoring module may be configured to store the indication of the occurrence of an event in a dedicated field in the memory, wherein the dedicated field corresponds to the particular sensor triggered by the occurrence of a predetermined event. This advantageously allows the component controller to identify which particular predetermined event occurred by the location of the indication in the memory, such that knowledge about the transport or storage conditions of a component can be quickly obtained.

The alarm system may be a fire alarm system.

The component may be a fire detection component, such as a heat detector or a smoke detector.

The component may be a fire alarm control panel, preferably an addressable fire alarm control panel. The component may be a fire suppression component such as a sprinkler system or fire door holder. The component may be a fire notification component, such as a visual or audible fire alarm, or voice evacuation system. The alarm system may be an intrusion alarm system. The component may be an infrared or motion sensor.

Viewed from a second aspect, the present disclosure provides a method of monitoring a component for an alarm system, the method comprising: determining, by a monitoring module of the component, that a predetermined event has occurred whilst power is not being supplied to the component, wherein the monitoring module has a local source of power; and storing, by the monitoring module, an indication of the occurrence of the event.

The component may be as discussed above in the first aspect and optionally may include any/all of the further features discussed above.

The step of storing of an indication of the occurrence of the event may comprise storing the indication in a memory of the monitoring module.

The step of determining that the predetermined event has occurred may comprise determining if at least one sensor has been triggered in response to a predetermined threshold value of an environmental parameter being exceeded.

The step of storing of an indication of the occurrence of the predetermined event may comprise storing the indication in a dedicated field in the memory of the monitoring module, wherein the dedicated field corresponds to the particular sensor triggered by the occurrence of the event.

The method of monitoring a component for an alarm system may further comprise transmitting the stored indication of the occurrence of the event in response to a read request.

The step of transmitting the stored indication of the occurrence of the event in response to the read request may comprise: supplying power to the component; transmitting the read request, by the component controller, to the monitoring module; receiving, by the monitoring module, the read request; and transmitting, by the monitoring module, the stored indication of the occurrence of the event to the component controller in response to the read request.

The method of monitoring a component for an alarm system may further comprise notifying, by the component, a user that the predetermined event has occurred in response to the component controller receiving the stored indication. Providing this safety feature of notifying a user that an event has occurred advantageously prevents the user from installing a potentially faulty component in an alarm system.

The step of transmitting the stored indication of the occurrence of the event in response to the read request may comprise: receiving, by the monitoring module, wireless transmission of a read request; and transmitting, by the monitoring module, the stored indication of the occurrence of the event in response to the read request.

Viewed from a third aspect, the present invention provides a computer-readable storage medium comprising instructions which, when executed by a monitoring module of a component for an alarm system, wherein the monitoring module has a local source of power, cause the monitoring module to carry out a method of monitoring the component, the method comprising: determining that a predetermined event has occurred whilst power is not being supplied to the component; and storing an indication of the occurrence of the event.

The method may be as discussed above in relation to the second aspect and optional features thereof.

DRAWING DESCRIPTION

A preferred embodiment will now be described in greater detail, by way of example only and with reference to the drawings, in which.

DETAILED DESCRIPTION

Figure 1:
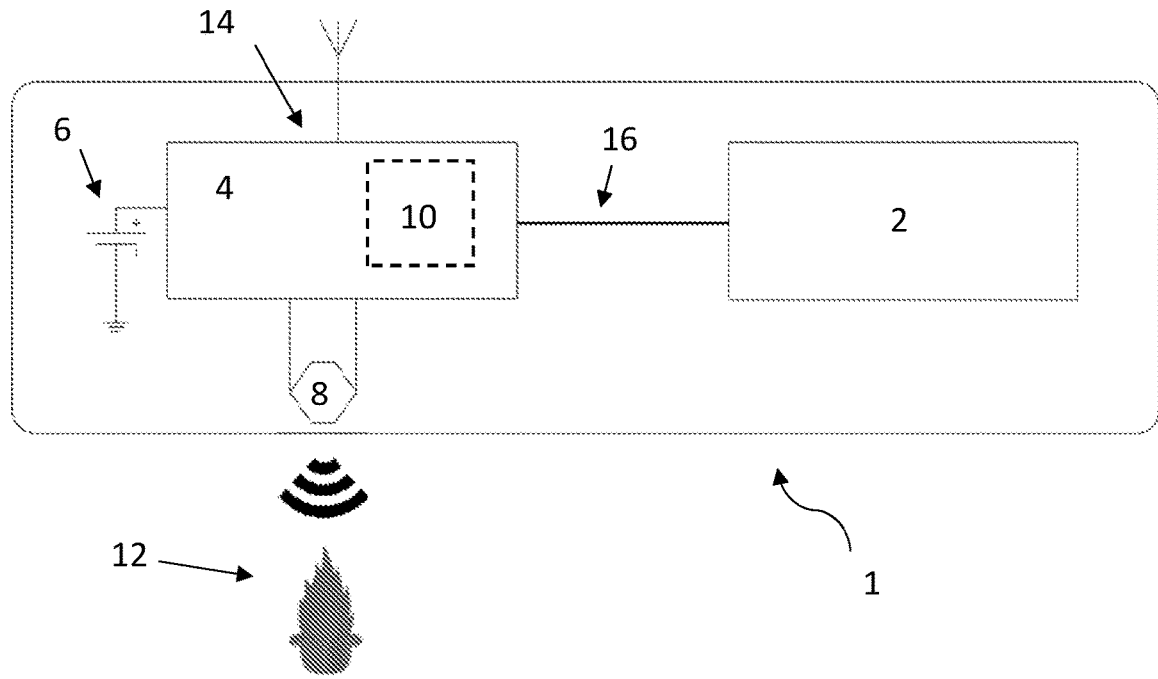
FIG. 1 shows a schematic illustration of a first smoke detector for use in a fire alarm system.

FIG. 1 shows a first smoke detector 1, for use in a fire alarm system.

The smoke detector 1 comprises a smoke detector controller 2. The smoke detector controller 2 could be any microcontroller or processor suitable for controlling the smoke detector 1 during normal operation, i.e. after the smoke detector 1 has been initialised in the fire alarm system.

The smoke detector controller 2 is configured to operate the smoke detector 1 during normal operation, for example, detecting an increase in smoke levels, determining that the smoke levels exceed a predetermined threshold value, and communicating to a fire alarm control panel via a network that the smoke levels have exceeded the threshold value.

The smoke detector 1 also comprises a monitoring module 4. The monitoring module 4 comprises a RFID tag and an antenna 14 for receiving and transmitting wireless signals.

The RFID tag is a semi-passive RFID tag and comprises a local source of power, such as an internal battery 6. The internal battery 6 provides the RFID tag with power so that it may function when the smoke detector 1 (and the smoke detector controller 2) is not being supplied with power through connection to a power source, such as the power source of the fire alarm system, e.g. a mains power source.

The monitoring module 4 is configured to determine occurrence of a predetermined event 12 and to store an indication of the occurrence of the event.

In this embodiment, the monitoring module 4 is configured to determine if the smoke detector 1 has been exposed to a temperature above a predetermined temperature threshold. Exposure to high temperatures may internally damage the smoke detector 1 and modify its sensitivity, thus rendering it unsafe.

The monitoring module 4 comprises a heat sensor 8. The heat sensor is powered by the internal battery 6. The heat sensor 8 is configured to detect an ambient temperature within the proximity of the smoke detector 1. The monitoring module 4 is configured to periodically interrogate the heat sensor 8 to determine whether the smoke detector 1 is being exposed to a temperature above a predetermined temperature threshold.

The monitoring module 4 further comprises a memory 10. Responsive to determining that the smoke detector 1 has been exposed to a temperature exceeding the predetermined threshold, the monitoring module 4 will store a flag within the memory 10 as an indication of the occurrence of this event. Optionally, the monitoring module 4 may record additional information, such as a maximum temperature to which the smoke detector 1 was exposed.

As discussed above, the monitoring module 4 comprises an RFID tag. The RFID tag allows an external RFID reader device to interrogate the monitoring module 4 to determine whether a flag has been stored in the memory 10 of the monitoring module 4 to indicate that the smoke detector 1 has been exposed to a temperature exceeding the predetermined temperature.

Additionally, or alternatively, the smoke detector controller 2 may be configured to internally communicate with the monitoring module 4 through a digital interface 16. For example, the smoke detector controller 2 may be capable of interrogating the monitoring module 4 to determine whether a flag has been stored in the memory 10 of the monitoring module 4 to indicate that the smoke detector 1 has been exposed to a temperature exceeding the predetermined temperature.

A method of monitoring the smoke detector 1, while the smoke detector 1 is not being supplied with power, is now described.

When the smoke detector 1 is in a state where it is not being supplied with power (e.g. the smoke detector 1 is stored in a warehouse or is being transported), the smoke detector 1 may experience a predetermined event 12 such as exposure to a temperature above a predetermined threshold.

Exposure to a temperature above the predetermined threshold will trigger the heat sensor 8. The monitoring module 4 determines that the smoke detector 1 has been exposed to excessive temperature, and in response stores an indication of the occurrence of the event in the memory 10 of the monitoring module 4.

The smoke detector 1 is therefore able to monitor the status of the smoke detector 1 during a period when it is not being supplied with power, and determine if the smoke detector 1 has been exposed to an excessive temperature that may have a negative impact on the normal mode of operation of the smoke detector 1.

In the illustrated embodiments, the monitoring module 4 can be interrogated in two ways.

In a first instance, the monitoring module 4 may receive a RFID read request from a transceiver (interrogator) via the antenna 14 of the RFID tag. In response to the RFID read request, the monitoring module 4 is configured to transmit any stored indications to the transceiver. In this way a manufacturer can advantageously check, before delivery to an end user, if a smoke detector 1 has been exposed to an excessive temperature during a period of storage. The use of an RFID interrogator, which does not require line-of-sight in order to interact with RFID tags like monitoring module 4, means that with a sufficiently powerful excitation field multiple smoke detectors 1 may be checked simultaneously, which can increase the speed and efficiency of the quality control procedure. Similarly, a transceiver may be utilised by the end user to check if the smoke detector 1 has been exposed to excessive temperature prior to receipt by the end user.

In a second instance, upon commencing initialisation of the smoke detector 1 (e.g. when the smoke detector 1 is connected into an alarm system during installation and is supplied with power), the smoke detector controller 2 starts up and transmits a read request to the monitoring module 4 to see if an indication of the smoke detector 1 being exposed to excessive temperature has been stored. If such an indication is returned as a result of the read request, then the smoke detector controller 2 may notify a user (which may be a maintenance engineer, or the like, tasked with installing the smoke detector 1 in the fire alarm system) that the smoke detector 1 has been exposed to excessive temperature and may be internally damaged as a result. The smoke detector controller 2 notifies the user by activating a notification means (not shown) of the smoke detector 1, such as an LED or buzzer.

Figure 2:
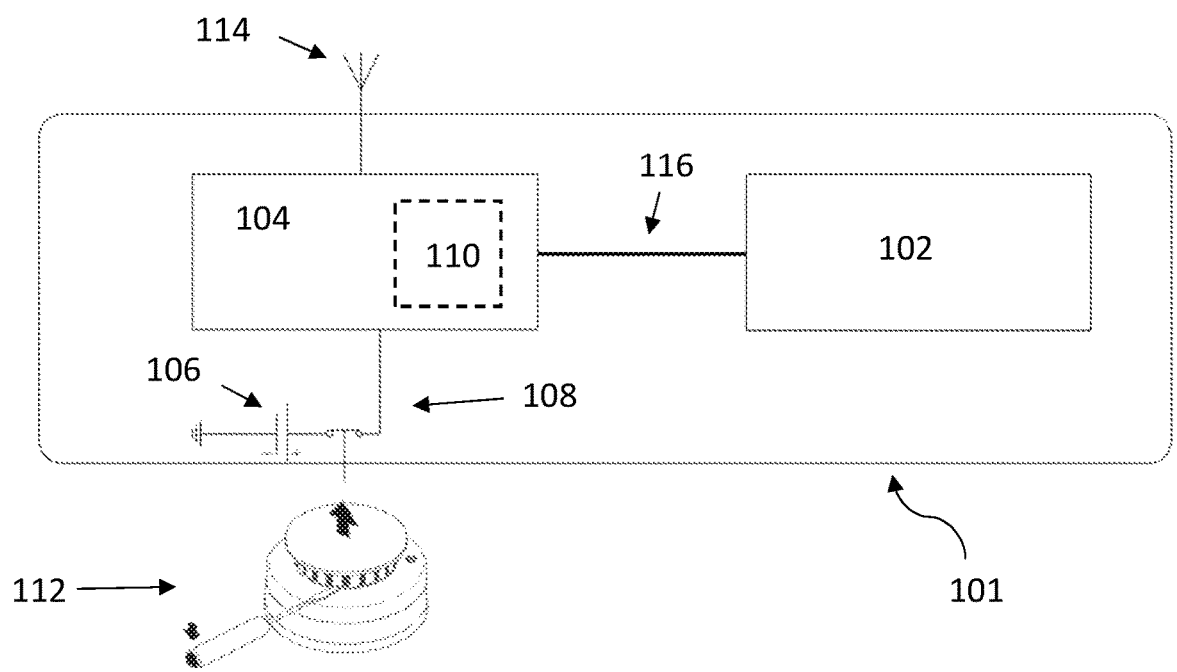
FIG. 2 shows a schematic illustration of a second smoke detector for use in a fire alarm system.

FIG. 2 shows a second smoke detector 101 for use in a fire alarm system.

The second smoke detector 101 operates in a similar manner to the first smoke detector 1 described above, but differs in the following aspects. Like elements are numbered with corresponding reference signs, but incremented by 100.

In this embodiment, the monitoring module 104 is configured to determine if the smoke detector 101 has been manipulated in a particular manner, and thus comprises a manipulation detection switch 108. Unauthorised manipulation of the smoke detector 101 may cause internal damage and the smoke detector 101 could become faulty and not suitable for installation in the fire alarm system.

The manipulation switch 108 is an embedded mechanical switch, which in this embodiment connects the monitoring module 104 to the internal battery 106. When the smoke detector 101 is manipulated in a particular manner, such as when the housing of the smoke detector 101 is removed, the switch 108 connects the monitoring module 104 to the internal battery 106, which is normally disconnected from the monitoring module 104 in this embodiment. Therefore, upon supply of power from internal battery 106, the monitoring module 104 detects that the smoke detector 101 has been manipulated and the monitoring module 104 will store a flag within the memory 110 as an indication of the occurrence of this event.

A method of monitoring the second smoke detector 101, while the smoke detector 101 is not being supplied with power, is now described.

When the smoke detector 101 is in a state where it is not being supplied with power (e.g. the smoke detector 101 is stored in a warehouse or is being transported), the smoke detector 101 may experience a predetermined event 112 such as unauthorised tampering with the smoke detector 101.

The unauthorised tampering, particularly the removal of the housing of the smoke detector 101, will cause the switch 108 to connect the monitoring module 4 to the internal battery 106. The monitoring module 104 detects that power from the battery 106 has been supplied and therefore determines that the housing has been removed. In response, the monitoring module 104 stores an indication of the occurrence of manipulation in the memory 110 of the monitoring module 104.

As above, the monitoring module 104 may be interrogated by the smoke detector controller 102 or by an RFID interrogator.

Whilst two exemplary events are illustrated above, being exposed to excessive temperature or manipulation of the housing, it will be appreciate that other types of events may be detected by similar techniques. For example, shock damage may be detected by a suitable shock sensor, for example including an accelerometer.

Furthermore, the detection techniques used in either of the first and second smoke detectors 1, 101 may be used for detection of the other predetermined event. For example, a mechanical switch could be provided for connecting the battery 6 to the monitoring module 4 when the temperature exceeds a predetermined temperature. Likewise, an active sensor could be provided for detecting that the housing of the smoke detector 101 has been removed.

In a further alternative embodiment a monitoring module 4 may comprise both a sensor 8 for detecting excessive temperature and a sensor 108 for detecting tampering. Then, the monitoring module 4 may store the indication of the occurrence of either predetermined event 12, 112. This advantageously allows the controller 2 or transceiver to quickly identify which particular predetermined event 12, 112 occurred, such that knowledge about the transport or storage conditions of the smoke detector 1 can be obtained.

Whilst the technique above has been described within the context of a smoke detector, it may be similarly employed in other components used within an alarm system.

What is claimed is:

1. A component for use in an alarm system comprising:
   a component controller configured to control the component when power is supplied to the component; and
   a monitoring module comprising a power source and configured to monitor the component when power is not supplied to the component,
   wherein the monitoring module is configured to determine occurrence of a predetermined event and to store an indication of the occurrence of the event;
   wherein the component controller is configured to start an initialisation procedure upon connection to a power source during installation of the component in an alarm system, the initialisation procedure comprising transmitting a read request to the monitoring module;
   wherein the monitoring module is configured to transmit the stored indication of the occurrence of the predetermined event in response to the read request; and
   wherein the component is configured to notify a user in response to the component controller receiving the stored indication of the occurrence of the predetermined event from the monitoring module.

2. A component according to claim 1, wherein the predetermined event comprises exposure of the component to a temperature exceeding a predetermined threshold temperature.

3. A component according to claim 1, wherein the predetermined event comprises manipulation of the component in a predetermined manner.

4. A component according to claim 1, wherein the monitoring module comprises an RFID tag.

5. A component according to claim 1, wherein the monitoring module is configured to directly receive a read request from a wireless transceiver.

6. A component according to claim 1, wherein the alarm system is a fire alarm system.

7. A method of monitoring a component for an alarm system, the method comprising:
   determining, by a monitoring module of the component, that a predetermined event has occurred whilst power is not being supplied to the component, wherein the monitoring module has a local source of power; and
   storing, by the monitoring module, an indication of the occurrence of the event;
   starting, by a component controller, an initialisation procedure upon connection to a power source during installation of the component in an alarm system, the initialisation procedure comprising transmitting a read request to the monitoring module;
   receiving, by the monitoring module, the read request;
   transmitting, by the monitoring module, the stored indication of the occurrence of the event to the component controller in response to the read request; and
   notifying, by the component, a user that the predetermined event has occurred in response to the component controller receiving the stored indication.

8. A method according to claim 7, wherein the monitoring module comprises an RFID tag.

9. A method according to claim 7, wherein the step of determining that the predetermined event has occurred comprises:
   determining if at least one sensor has been triggered in response to a predetermined threshold value of an environmental parameter being exceeded.

10. A method according to claim 7, wherein the step of transmitting the stored indication of the occurrence of the event in response to the read request comprises:
    receiving, by the monitoring module, wireless transmission of a read request; and
    transmitting, by the monitoring module, the stored indication of the occurrence of the event in response to the read request.

11. A component for use in an alarm system comprising:
    a component controller configured to control the component when power is supplied to the component; and
    a monitoring module comprising a power source and configured to monitor the component when power is not supplied to the component,
    wherein the monitoring module is configured to determine occurrence of a predetermined event and to store an indication of the occurrence of the event;
    wherein the predetermined event comprises manipulation of the component in a predetermined manner by removal of a housing of the component.

12. A component according to claim 11, wherein the monitoring module comprises an RFID tag.

13. A component according to claim 11, wherein the monitoring module is configured to transmit the stored indication of the occurrence of the predetermined event in response to a read request.

14. A component according to claim 13, wherein the component controller is configured to issue the read request after power has been supplied to the component.

15. A component according to claim 14, wherein the component is configured to notify a user in response to the component controller receiving the stored indication of the occurrence of the predetermined event from the monitoring module.

16. A component according to claim 11, wherein the monitoring module is configured to directly receive a read request from a wireless transceiver.

17. A component according to claim 11, wherein the alarm system is a fire alarm system.

* * * * *